(No Model.)
W. H. CLINTON & C. W. BOWKER.
TEA KETTLE.
No. 535,093. Patented Mar. 5, 1895.
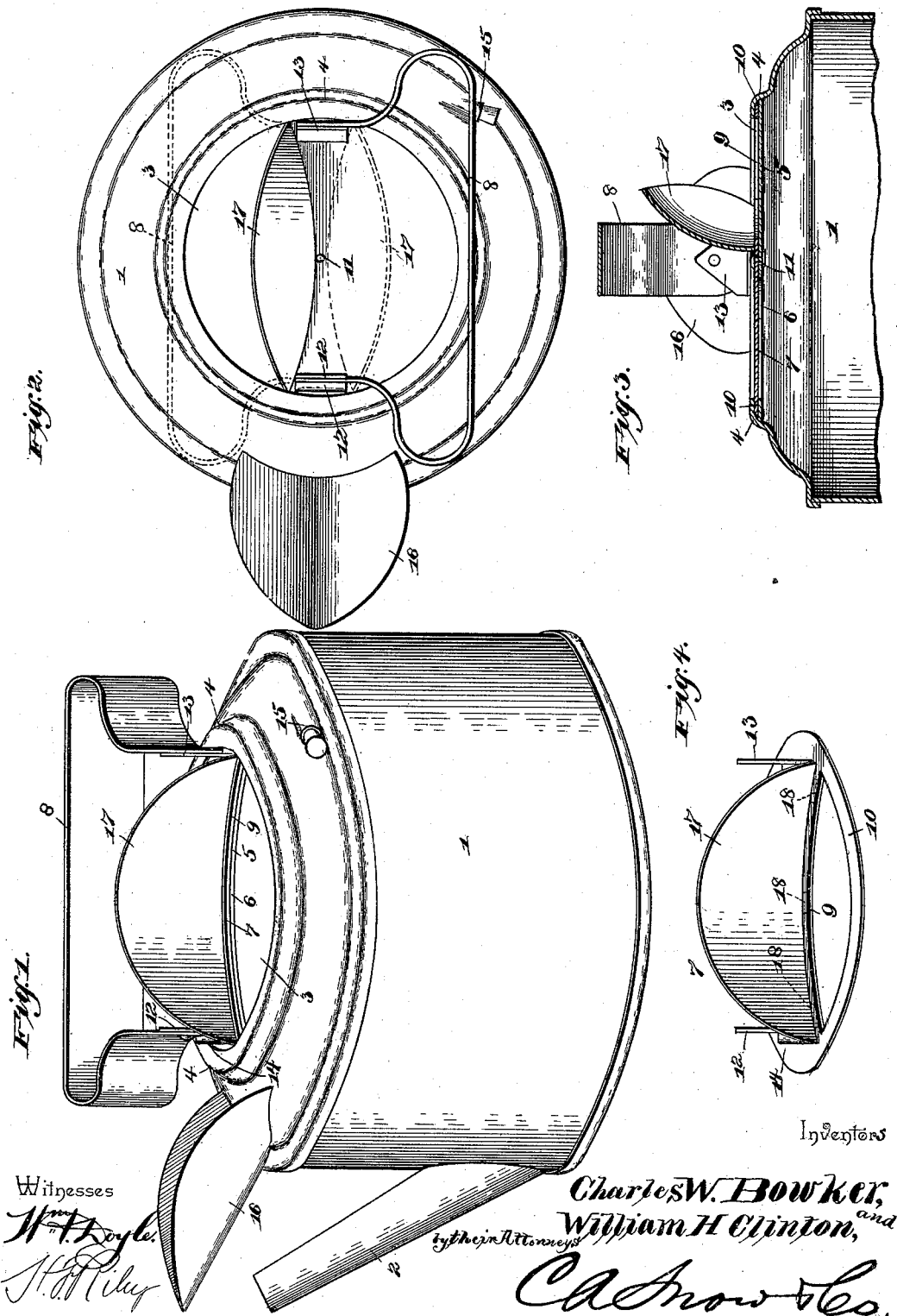
Witnesses
Inventors
Charles W. Bowker,
William H. Clinton,
by their Attorneys
C. A. Snow & Co.

UNITED STATES PATENT OFFICE.

WILLIAM H. CLINTON AND CHARLES W. BOWKER, OF CLINTONVILLE, WISCONSIN.

TEA-KETTLE.

SPECIFICATION forming part of Letters Patent No. 535,093, dated March 5, 1895.

Application filed September 29, 1894. Serial No. 524,488. (No model.)

*To all whom it may concern:*

Be it known that we, WILLIAM H. CLINTON and CHARLES W. BOWKER, citizens of the United States, residing at Clintonville, in the county of Waupaca and State of Wisconsin, have invented a new and useful Tea-Kettle, of which the following is a specification.

The invention relates to improvements in tea kettles.

The object of the present invention is to improve the construction of tea kettles, and to provide a simple and inexpensive one which will prevent, in the handling of the kettle, the steam from coming in contact with the person and scalding the hand.

The invention consists in the construction and novel combination and arrangement of parts hereinafter fully described, illustrated in the accompanying drawings, and pointed out in the claims hereto appended.

In the drawings: Figure 1 is a perspective view of a tea kettle constructed in accordance with this invention, the top being open and the handle swung down. Fig. 2 is a plan view, the cover being closed. Fig. 3 is a transverse sectional view. Fig. 4 is a detail view of one of the sections of the cover.

Like numerals of reference indicate like parts in all the figures of the drawings.

1 designates a tea kettle constructed of any suitable material and provided with the usual spout 2 and having, at its top, a circular opening 3, around which is an annular groove or way 4, which may be formed by a ring or band secured to the top of the kettle at the edges of the opening thereof. The cover of the kettle is composed of a stationary plate or section 5, arranged in the groove or way and having an opening 6, and a centrally-pivoted rotary plate or section 7, carrying a swinging handle or bail 8, and provided with an opening 9, which may be made to register with the opening 6 of the stationary section 5 when it is desired to fill the kettle, and which is adapted to be turned away from the opening 6 when it is desired to close the latter by covering the same.

The sections 5 and 7 of the cover are, preferably, disk-shaped, as illustrated in Fig. 4 of the accompanying drawings, and they are provided with approximately elliptical openings whereby a curved supporting portion 10 is formed on each section, which increases the strength and durability of the cover and serves to brace each section.

The pivot 11 is located centrally of the sections; and the rotary section 7 is provided, at opposite sides, with ears 12 and 13, to which are pivoted the terminals of the handle 8 of any suitable construction; and the ear 12 is provided with an offset portion or bend 14, arranged horizontally and adapted to support the swinging handle out of contact with the body of the kettle when the said swinging handle is turned down out of the way of the steam when the kettle is open, as illustrated in Fig. 1 of the accompanying drawings.

The kettle is provided at any suitable point, preferably at one side, with a steam-escape tube 15, forming an opening through which steam may readily escape when water is poured from the spout 2, to prevent any pressure on the lid or cover. The kettle is provided, directly above the spout, with an inclined, outward-extending shield 16, having angularly-disposed sides adapted to deflect the steam laterally away from the hand of the person holding the kettle. The shield is tapering at its outer end, and it may be secured to or mounted on the kettle in any desired manner.

The rotary section of the lid or cover is provided with a curved, upward-extending, approximately segmental shield 17, located at the inner edge of the opening 9, adjacent to the ears 12 and 13, to prevent steam from coming in contact with the hand while the lid or cover is being rotated. The curved or bowed shield 17 may be secured to the rotary portion of the cover in any suitable manner, and is preferably provided with lugs 18, which interlock with slots of the rotary portion 7.

It will be apparent that the kettle is exceedingly simple and inexpensive in construction, and that it is capable of absolutely preventing steam from coming in contact with the person holding it. It will also be seen that the handle by which the kettle is carried also serves as the means for rotating the movable portion of the cover.

Changes in the form, proportion, and the minor details of construction may be resorted to without departing from the principle or sacrificing any of the advantages of this invention.

What we claim is—

1. A kettle comprising a body portion provided at its top with an opening, a rotary cover portion pivotally mounted on the body and arranged to swing over said opening, and a swinging handle or bail hingedly mounted at its ends on the rotary portion and adapted to be turned down out of the way when the opening is exposed, said handle or bail enabling the kettle to be carried and the rotary portion to be operated, substantially as described.

2. A kettle comprising a body portion provided at its top with an opening, a rotary cover-portion arranged to swing over the opening of the body of the kettle, and a guard or shield carried by the rotary cover-portion in its movements, and adapted to be located at the inner side of the opening when the latter is exposed, substantially as described.

3. A kettle comprising a body having an opening at the top and provided with an annular way, a stationary disk arranged in the way and provided at one side with a substantially elliptical opening forming an outer curved supporting piece, a rotary disk centrally pivoted to the stationary disk and provided with a similar opening forming a curved supporting portion and adapted to register with the opening of the stationary disk, said rotary disk being arranged to swing over the opening of the stationary disk to cover the same, and a handle mounted on the rotary disk, substantially as described.

In testimony that we claim the foregoing as our own we have hereto affixed our signatures in the presence of two witnesses.

WILLIAM H. CLINTON.
CHARLES W. BOWKER.

Witnesses:
WILLIS E. SWITZER,
ALICE H. TORREY.